United States Patent [19]

Caramaschi et al.

[11] Patent Number: 5,362,800
[45] Date of Patent: Nov. 8, 1994

[54] UNSATURATED POLYESTER RESINS

[75] Inventors: Giuseppe Antonio Caramaschi, Montevarchi; Sergio Sanchioni, Terranuova B.ni; Marco Bocci, S. Giovanni V.no.; Maurizio Leonardi, Perugia, all of Italy

[73] Assignee: Alusuisse Italia S.p.A., Milan, Italy

[21] Appl. No.: 41,353

[22] Filed: Apr. 1, 1993

Related U.S. Application Data

[63] Continuation-in-part of Ser. No. 700,859, May 16, 1991, abandoned.

[30] Foreign Application Priority Data

May 16, 1990 [IT] Italy .................. 20319 A/90

[51] Int. Cl.$^5$ ............................................. C08G 63/91
[52] U.S. Cl. ........................................ 525/48; 525/43; 525/44; 528/272; 528/299; 528/302; 528/303; 528/306
[58] Field of Search ............ 525/48, 43, 44; 528/272, 299, 302, 303, 306

[56] References Cited

U.S. PATENT DOCUMENTS

| | | | |
|---|---|---|---|
| 3,001,967 | 9/1961 | Willersinn | 525/48 |
| 3,239,581 | 3/1966 | Ralscle et al. | 260/863 |
| 3,249,574 | 4/1966 | Meyer | 260/30.4 |
| 3,398,213 | 8/1968 | Chetaklan | 260/863 |
| 3,574,787 | 4/1971 | Rudolph et al. | 260/863 |
| 4,119,680 | 10/1978 | Vachon | 525/30 |
| 4,408,018 | 10/1983 | Bartman et al. | 525/300 |
| 4,487,177 | 1/1991 | Den Hartog et al. | 524/501 |
| 4,906,684 | 3/1990 | Say | 524/548 |
| 4,939,233 | 7/1990 | Jenkins et al. | 528/272 |
| 4,946,932 | 8/1990 | Jenkins | 528/272 |

*Primary Examiner*—John Kight, III
*Assistant Examiner*—Richard Lee Jones
*Attorney, Agent, or Firm*—Fisher, Christen & Sabol

[57] ABSTRACT

Unsaturated polyester resin compositions (UPRs) containing monomeric compounds of the formula (I):

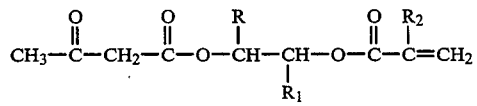

wherein R, $R_1$ and $R_2$ are H or a methyl group, for use as accelerators and crosslinking agents. A process for preparing the UPRs.

26 Claims, No Drawings

UNSATURATED POLYESTER RESINS

This application is a continuation-in-part of prior U.S. application Ser. No. 07/700,859, filed 5/16/91, now abandoned.

BACKGROUND OF THE INVENTION

1. Field Of The Invention

The invention relates to the field of unsaturated polyester resins (which are indicated in the following text by the symbol UPR) and, in particular, to the field of substances which can be used in accelerating and crosslinking monomers in the polymerization (or curing) of UPRs.

2. Background Art

UPRs, in their most common form, consist of the following, as is known, for example in *Ullmann's Enzyklopadie der techn. Chemie,* 4th edition, Vol. 19, pages 79 to 88.

(a) an unsaturated polyester resin, commonly called alkyd, obtained in polycondensation reaction by reacting under appropriate conditions one or more glycols with one or more carboxylic acids or anhydrides thereof, of which at least one is a dicarboxylic acid (or anhydride) ethylenically unsaturated in the $\alpha,\beta$-position relative to the carboxyl groups. In general, the alkyd represents 40 to 90 percent of the UPR.

(b) One or more vinyl monomers which act as a solvent and at the same time as a crosslinking agent for the alkyd, in a concentration of 10 to 60 percent relative to the UPR.

(c) Polymerization inhibitors and/or stabilizers which allow the UPR to be handled and transported under safe conditions. These substances are added to the resin in a proportion of 50 to 1000 ppm.

(d) Technological additives of various types, incorporated in the UPR, in order to make it suitable for specific applications (concentrations of about 0.5 to 2 percents.

(e) Substances (commonly called accelerators or promoters) which are capable of appropriately modifying the polymerization kinetics of the UPR, with a view to its end use (concentrations of about 0.05 to 1 percent).

Although the substances listed under (a), (b) and (c) are always present in the UPR, the substances listed under items (d) and (e) may or may not be present, as the case may be.

The vinyl monomers [mentioned under item (b) above] are products which, when appropriately activated by an addition of catalysts, reacts with the double bond of the $\alpha,\beta$-unsaturated dicarboxylic acid incorporated in the alkyd. The reaction which takes place is a crosslinking reaction, also commonly called curing, which leads to a crosslinked product, whose chemical, physical and mechanical characteristics depend on the raw materials of the UPR and on the curing conditions.

Among the vinyl monomers most commonly used hitherto for curing UPRs, the following are mentioned: styrene, $\alpha$-methylstyrene, p- or m-methyl-styrene, divinylbenzene, diallyl phthalate and its prepolymers, diallyl isophthalate, diallyl terephthalate and its prepolymers, diallyl isophthalate, diallyl terephthalate, N-vinylpyrrolidone, triallyl cyanurate, diallylmelamine and the like, by themselves or in various mixtures with one another. Other vinyl monomers which can be used are alkyl-styrenes and other allyl, acrylate or methacrylate esters. Although the most widely used of the vinyl monomers has been styrene, it causes problems of polluting the work environment, so that legislation in various countries is becoming increasingly restrictive with regard to its use.

Various products such as metal salts, for example, of cobalt manganese, vanadium and iron, tertiary aromatic amines, such as, dimethylaniline, dimethyl-p-toluene, diethyl-aniline, phenyldiethanolamine and the like have hitherto been used as accelerators or promoters of the curing reaction [regarding these, see item (e) above].

These known accelerators have not been found to be free of disadvantages, such as, in particular, a relatively low efficiency thereof, which required elevated temperatures and/or longer curing times in certain cases. Thus, for example, such accelerators gave complete polymerization of the UPR only when hot, that is, at temperatures from 50° to 180° C. Moreover, such accelerators require relatively long crosslinking times, which are inadequate for use on modern machines which, for their high productivity, require ever faster curing reactions.

U.S. Pat. No. 3,574,787 further discloses acetoacetic esters as additional accelerators for unsaturated polyester systems. These conventional acetoacetic esters such as the acetoacetic esters of mono- or di-functional alcohols also show a relatively low efficiency, but, in particular, they do not act as crosslinking monomers and therefore remain unchanged in the polymer lattice. Their concentration is therefore limited to about 1 percent by weight relative to the polymer composition because otherwise the properties of the polymer are unfavorably influenced.

BROAD DESCRIPTION OF THE INVENTION

The principal object of the invention is to provide UPRs which have improved curing characteristics and are, therefore, suitable for use on modern production machinery with high productivity. Another object of the invention is to provide substances capable of improving the curing or crosslinking of UPRs. In particular, a specific object of the invention is to provide substances which, in the polymerization of the UPR, perform a dual function as both crosslinking agent and accelerator. A further object of the invention is to provide substances which give improved performance as compared with both known crosslinking agents and known accelerators hitherto used for curing UPRs. A still further object of the invention is to provide a process for preparing the UPRs.

These and other objects and advantages of the invention which will become clear below, are achieved by the unsaturated polyester resin compositions and process of the invention.

The unsaturated polyester resin compositions of the invention comprises at least one unsaturated polyester resin and 10 to 60 percent by weight, relative to the unsaturated polyester resin composition, of one or more crosslinking monomers. The crosslinking monomers comprise at least one compound of the formula (I):

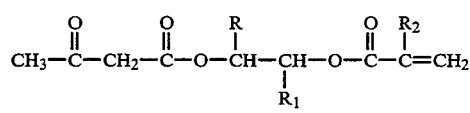

wherein R, $R_1$ and $R_2$ each is H or a methyl group.

It has now been found that compounds of the formula (I) above perform in the curing (crosslinking) process of unsaturated polyester resins, surprisingly, not only with a crosslinking action when substituted in this way for traditional vinyl monomers, but also with an accelerating action. Not only this, but the accelerating efficiency of the compounds of the formula (I) according to the invention is significantly higher than that of the known accelerators, especially in polymerizations at ambient temperature.

In their role as crosslinking agents, the compounds (I) are substitute products in particular for styrene and, in this function, owing to their relatively low vapor pressure, diminish the styrene concentration in the work environment or even reduce it completely to zero.

However, even if they are used in conjunction with other vinyl monomers, in particular styrene, the compounds (I) allow great advantages to be obtained in terms of productivity and also in ecological terms, because the reduction in work cycle times due to the accelerating efficiency of the compounds (I) more or less proportionally reduces the evaporation of styrene or other relatively volatile monomers.

Moreover, in their role as accelerators, the compounds (I) are so active that they allow the curing of UPRs (such as, those containing diallyl phthalate as an additional conventional monomer) at ambient temperature, which here to before have been completely curable only when hot. The monomers can thus be applied at ambient temperatures or also when hot, and they do not exclude conjoint use either with vinyl monomers or with hitherto used conventional accelerators or promoters.

Examples of some compounds corresponding to the formula (I) described above are:

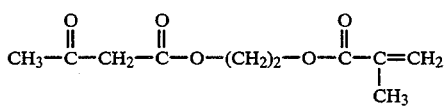

Acetoacetoxy-ethyl methacrylate

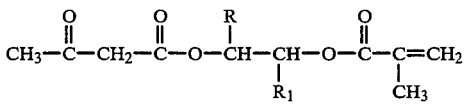

(wherein R = H and $R_1$ = $CH_3$;
or R = $CH_3$ and $R_1$ = H)
Acetoacetoxy-isopropyl methacrylate Thus, the surprising character of the invention rests precisely in what has been stated above.

In fact, acetylacetone or similar products are well known as co-accelerators and, in their turn, the vinyl compounds, allyl compounds, acrylates and methacrylates are widely used as monomers in UPR compositions, but their conjoint presence within the same molecule evidently confers a strong synergism on the catalytic system, in such a way that complete polymerization of some resin types at ambient temperature becomes possible. Such complete polymerization hitherto had been obtainable only when a hot system was used.

It should also be stressed that the compounds are, as already stated, also crosslinking monomers and, as such, do not remain free in the cured polymer but instead enter the polymeric network to form a part thereof, which is not the case with the common polymerization accelerators or promoters. They can therefore be used by themselves at concentrations of 10 to 60 percent by weight, preferably of 20 to 50 percent by weight, more preferably of 25 to 45 percent by weight, for the function of crosslinking monomers even in the absence of monomers of the conventional type.

On the other hand, if the compounds (I) are used conjointly with conventional crosslinking agents or accelerators, the total monomer concentration relative to UPR is 10 to 60 percent by weight. It is then preferable to employ concentrations of the compounds (I) of 0.1 to 59 percent by weight, more preferably of 0.1 to 30 percent by weight, relative to the UPR composition, and concentrations of said conventional compounds of 1 to 59.9 percent, preferably of 1 to 30 percent by weight. For example, one or more compounds (I) can be employed with one or more monomers such as styrene, p-methyl-styrene or other alkylstyrenes, tetrachloroethylene, vinyltoluene, N-vinylpyrrolidone, diallyl phthalate or prepolymers thereof, and the like. Preferably, styrene or diallylphthalate is employed as the additional monomer.

If the compounds (I) are conjointly used with diallylphthalate as conventional crosslinking agent, curing can be effected readily at ambient temperature.

Moreover, the compounds (I) can be employed together with conventional curing accelerators such as those mentioned above, for example, together with salts of cobalt, manganese, vanadium and iron, with β-diketones which are derivatives of acetylacetone, derivatives of acetoacetamide and esters of acetoacetic acid, and with tertiary aromatic amines. Such conventional accelerators are used in quantities of 0.05 to 1 part by weight per 100 parts of alkyd. For the above-mentioned metal salts, these concentrations refer to the metal as such.

As the unsaturated polyesters or alkyds, which can be used with the monomeric compounds (I), are those which have been obtained by the reaction of one or more glycols with one or more ethylenically α,β-unsaturated dicarboxylic acids and, if appropriate, also with one or more saturated dicarboxylic acids. The glycols can be selected, for example, from ethylene glycol, 1,2-propylene glycol, 1,3-butanediol, 1,4-butanediol, diethylene glycol, dipropylene glycol, neopentyl glycol and the bis-(β-hydroxypropyl) ether of bisphenol A. In general, any other type of chemical compound having two hydroxyl groups in the molecule itself, for example, polymeric diols, can be used.

With regard to the ethylenically α,β-unsaturated dicarboxylic acids, one can for example, maleic acid, fumaric acid, citraconic acid, mesaconic acid and the like, or the anhydrides thereof. Other unsaturated dicarboxylic acids can be used for the same purpose.

Among the saturated dicarboxylic acids which can be incorporated into the unsaturated polyester according to the invention, phthalic acid (or anhydride), tetrahydrophthalic acid (or anhydride), hexahydrophthalic acid (or anhydride), isophthalic acid, terephthalic acid, adipic acid and succinic acid (or anhydride) are listed.

Also in this case other polycarboxylic acids can be used, but while the presence of the unsaturated dicarboxylic acids (or anhydrides) is indispensable for obtaining a UPR, the saturated dicarboxylic acids indicated above can also be absent from the structure of the alkyd.

In particular cases, when it is desired, for example, to obtain self-extinguishing products, dibromoneopentyl glycol, the tetrabromo derivative of bisphenol A, tetrabromophthalic acid (or anhydride), tetrachlorophthalic acid (or anhydride), endomethylene-hexachlorophthalic acid (HET acid) or the anhydride thereof (chlorendic anhydride) and the like can be used as components of the alkyd.

Finally, monohydric alcohols or monobasic carboxylic acids are used as chain terminators and, if it is desired to obtain branched chains, polyhydric alcohols such as, glycerol, trimethylolpropane or pentaerithritol, can be used.

The unsaturated polyester resin or alkyd is present in the composition according to the invention in concentrations of generally between 40 and 90 percent.

As the polymerization inhibitors and/or stabilizers which can be used in the UPRs according to the invention, hydroquinone, p-benzoquinone, t-butyl-hydroquinone, toluohydroquinone, tertiary-butyl-catechol, quaternary ammonium salts, copper salts and the like are examples.

The technological additives, which can optionally be incorporated into the UPRs according to the invention, include surfactants, viscosity depressants, thixotropic agents, various pigments, paraffins, waxes, UV stabilizers and the like.

The curing reaction of the UPRs according to the invention can take place either at ambient temperature or when hot (generally up to about 180° C.). The curing reaction and it is initiated by a catalyst which is dissolved or dispersed in the resin, usually just before curing. The most commonly used catalysts, in a percentage quantity of 0.1 to 3 percent relative to the UPR, are the peroxides, of which hydrogen peroxide, methyl ethyl ketone peroxide, benzoyl peroxide, lauryl peroxide, dicumyl peroxide, p-tertiarybutyl perbenzoate, acetylacetone peroxide, methyl isobutyl ketone peroxide and the like, are mentioned by way of example.

As is well known in the field, not only the curing catalyst but also inert inorganic fillers (silicates, carbonates and the like), additives capable of compensating for the shrinkage which manifests itself during curing (low-profile or low shrink additives) and/or a reinforcement of glass fiber, consisting of filaments of small dimensions, of a continuous filament or of a so-called mat (glass fiber felt) or fabrics of glass or other fibers (carbon, aramid fibers and the like), can be added to the UPR before curing in order to improve the mechanical properties of the finished product.

DETAILED DESCRIPTION OF THE INVENTION

The examples which follow are given solely for illustrative purpose and in no way limit the various possible forms of realizing the invention.

EXAMPLE 1

This example illustrates the effect of one of the accelerator monomers, which are the subject of the invention, namely, of acetoacetoxy-ethyl methacrylate (from now on indicated by the symbol AAEMA), on the polymerization.

With reference to Table No. 1a, the UPRs indicated are all based on the same alkyd prepared according to a formulation involving the use of proportional quantities of 1.05 mol of 1,2-propanediol, 0.5 mol of phthalic anhydride and 0.5 mol of maleic anhydride. These raw materials, placed into a flask fitted with a stirrer, are heated under a nitrogen stream from ambient temperature up to 200° C., the reaction then being continued at this temperature until the acid number of the mass has fallen to 45 mg of KOH/g. The water of reaction is removed by means of a distillation column placed on top of the flask and regulated in such a way that the water (with small quantities of glycol) is separated off at the top and most of the glycol is refluxed into the reactor. The alkyd obtained is stabilized with about 200 ppm of hydroquinone and then dissolved at about 50° C. in the monomers and/or monomer accelerators indicated in Table No. 1a. Depending on the monomers and/or monomer accelerators used, 10 different UPRs were obtained, to which cobalt octoate and a peroxide initiator (see indications in the Table) to initiate the polymerization at 25° C. were added.

The polymerization test was carried out according to UNI standard 476/88 which requires the recording of the so-called gelling time, of the polymerization time and of the so-called delta time (or curing time) and of the maximum temperature reached during the polymerization (exothermic peak).

When examining the data in Table No. 1a, it is found that AAEMA greatly reduces the polymerization times and, at the same time, that this product can be used as a substitute monomer for styrene (cf. UPR No. 6). The data also shows a higher polymerization rate as compared with the latter.

The test with the UPR Nos. 7 to 10 also show that the accelerating effect is due to the presence of both the acetylacetone structure and the unsaturated group (in this case represented by a methacrylate group) within the AAEMA molecule.

In fact, it is found that:

acetylacetone by itself has an accelerating effect at low concentration (0.5, cf. UPR No. 7), but does not show a further significant effect at higher concentration (10 percent, cf. UPR No. 8); in this latter case, acetylacetone is certainly unsuitable because, since this monomer is not reactive towards the alkyd, it remains free in the interior of the crosslinked polymer, modifying the mechanical properties thereof and making it susceptible to evaporation losses, extraction by water or solvents, and so forth.

methyl methacrylate (indicated by the symbol MMA) does not much alter the polymerization times as compared with UPR containing only styrene (compare UPR No. 10 with UPR No. 1).

the acetylacetone/MMA mixture (cf. UPR No. 9) introduces into the system the same groups which are present in the AAEMA moleculer, but the polymerization times are much longer than those obtained with UPR No. 5 which is fairly similar to UPR No. 9 as a composition, but differs from it precisely by the fact that, in UPR No. 5, the two groups (acetylacetate and unsaturated group) are within the same molecule, whereas they form part of two different substances in UPR No. 9. This demonstrates that the strong accelerating effect is due to the presence of the two above-mentioned functions within the same molecule.

Analogous results are obtained with an alkyd formulated in a different way. Table No. 1b gives the results observed on UPRs obtained from an alkyd prepared as described above, but starting from proportional raw material quantities of 0.8 mol of 1,3-butanediol, 0.25 mol of ethylene glycol, 0.3 mol of isophathalic acid and 0.7 mol of fumaric acid. The final acid number of the alkyd was 42, while the stabilizer was toluhydroquinone, in a proportion of 200 ppm.

This demonstrates that the accelerating effect of the promoter monomers used in the invention is independent of the structure of the alkyd.

TABLE No. 1a

UPR polymerization in styrene/AAEMA and in styrene/MMA at 25° C.
(alkyd = 65 percent; monomers = 35 percent)

| MONOMERS | UPR No. 1 | UPR No. 2 | UPR No. 3 | UPR No. 4 | UPR No. 5 | UPR No. 6 | UPR No. 7 | UPR No. 8 | UPR No. 9 | UPR No. 10 |
|---|---|---|---|---|---|---|---|---|---|---|
| Styrene % | 35.0 | 34.5 | 34.0 | 30.0 | 25.0 | — | 34.5 | 25.0 | 25.0 | 25.0 |
| AAEMA (%) | — | 0.5 | 1.0 | 5.0 | 10.0 | 35.0 | — | — | — | — |
| Acetylacetone (%) | — | — | — | — | — | — | 0.5 | 10.0 | 5.0 | — |
| MMA (%) | — | — | — | — | — | — | — | — | 5.0 | 10.0 |
| POLYMERIZATION PARAMETERS | | | | | | | | | | |
| Gelling time | 50' | 35'30" | 28'30" | 13' | 8'20" | 8'05" | 40'20" | 36' | 38'25" | 48' |
| Polymerization time | 69' | 47' | 39' | 19'50" | 13'30" | 12'55" | 55'50" | 49'40" | 54'10" | 69'15" |
| Peak temperature (°C.) | 155° | 160° | 162° | 164° | 165° | 140° | 150° | 155° | 150° | 147° |
| Delta time | 19' | 11'30" | 10'30" | 6'50" | 5'10" | 4'50" | 15'30" | 13'40" | 15'45" | 21'15" |

Polymerization conditions:
Methyl ethyl ketone peroxide (50 percent solution in di-n-butylphthalate): 0.8 part/100 parts of UPR
Co octoate (6 percent solution in xylene): 0.3 part/100 parts of UPR

TABLE No. 1b

UPR polymerization in styrene/AAEMA and in styrene/acetoacetone/MMA at 25° C. (alkyd = 65 percent; vinyl monomers = 35 percent)

| VINYL MONOMERS | UPR No. 11 | UPR No. 12 | UPR No. 13 | UPR No. 14 |
|---|---|---|---|---|
| Styrene % | 35.0 | 30.0 | — | 25.0 |
| AAEMA (%) | — | 5.0 | 35.0 | — |
| Acetylacetone (%) | — | — | — | 5.0 |
| MMA (%) | — | — | — | 5.0 |
| POLYMERIZATION PARAMETERS | | | | |
| Gel time | 35'20" | 11'40" | 6'14" | 25'30" |
| Polymerization time | 50'55" | 19'15" | 10'52" | 37'42" |
| Peak temperature (°C.) | 160° | 175° | 169° | 164° |
| Delta time | 15'35" | 7'35" | 4'38" | 12'12" |

Polymerization conditions:
Methyl ethyl ketone peroxide (50 percent solution in di-n-butylphthalate): 0.8 part/100 parts of UPR
Co octoate (6 percent solution in xylene): 0.3 part/100 parts of UPR

EXAMPLE 2

For the UPRs of this Example (Table No. 2), the same alkyd as in Example 1, Table No. 1a, was used. It is shown that the accelerator monomers which are the subject of the present invention (in the particular case AAEMA) are also effective with other monomers of the conventional type, other than styrene.

EXAMPLE 3

For the tests cited in this example (cf. Table No. 3), the UPRs are based on an alkyd prepared by the procedures described in Example 1 from proportional raw material quantities of 1.08 mol of 1,2-propanediol, 0.3 mol of phthalic anhydride and 0.7 mol of maleic anhydride. The condensation reaction was stopped when the acid number of the alkyd became equal to 35 mg of KOH/g, whereupon 200 ppm of hydroquinone stabilizer were added.

This example describes the effect of the accelerator monomers which are the subject of the invention on the polymerization of UPRs in which the monomer consists of diallyl phthalate (indicated by the symbol DAP).

It is known to those ordinarily skilled in this field, that UPRs are polymerizable in DAP at times and with results which are industrially acceptable only at temperatures higher than ambient temperature. This is confirmed by the UPRs No. 23 and Nos. 28, 29 and 30 (Table No. 3) which are clearly under polymerized.

To demonstrate this fact, the UPRs of this example were examined not only with respect to the polymerization times, but also with respect to their surface hardness (Barcol hardness after 24 hours of polymerization) and unreacted DAP (this analysis is carried out by subjecting the cured polymer to extraction with a solvent, in general acetone, and then analyzing by gas chromatography the unreacted monomer which has been extracted by the solvent).

TABLE 2

Polymerization of UPR at 25° C. in various vinyl monomers (alkyd = 65 percent; vinyl monomers = 35 percent)

| VINYL MONOMERS | UPR No. 15 | UPR No. 16 | UPR No. 17 | UPR No. 18 | UPR No. 19 | UPR No. 20 | UPR No. 21 | UPR No. 22 |
|---|---|---|---|---|---|---|---|---|
| p-Methyl-styrene (%) | 35.0 | 30.0 | — | — | — | — | — | — |
| Tetrachloroethylene (%) | — | — | 35.0 | 30.0 | — | — | — | — |
| N-vinyl-pyrrolidone (%) | — | — | — | — | 35.0 | 30.0 | — | — |
| Vinyl-toluene (%) | — | — | — | — | — | — | 35.0 | 30.0 |
| AAEMA (%) | — | 5.0 | — | 5.0 | — | 5.0 | — | 5.0 |
| POLYMERIZATION PARAMETERS | | | | | | | | |
| Gel time | 40'20" | 10'30" | 58' | 18'40" | 35'30" | 7'42" | 45' | 13'40" |
| Polymerization time | 60'50" | 16'45" | 84'40" | 27'50" | 55'40" | 12'52" | 69' | 22'05" |
| Peak temperature (°C.) | 142° | 160° | 135° | 145° | 145° | 165° | 138° | 155° |
| Delta time | 20'30" | 6'15" | 26'40" | 9'10" | 20'10" | 5'10" | 24' | 8'25" |

Polymerization conditions:
Methyl ethyl ketone peroxide (50 percent solution in di-n-butylphthalate): 0.8 part/100 parts of UPR
Co octoate (6 percent solution in xylene): 0.3 part/100 parts of UPR It is clear from the result that if the UPR does not contain AAEMA, DAP reacts only partially, even in the DAP/styrene systems, in which only the latter participates to a significant extent in the polymerization reaction, while the DAP remains partially unchanged in the interior of the polymer, plasticizing it and reducing the surface hardness.

compounds in which the structure of acetylacetone or of acetoacetic acid is combined within the same molecular with an ethylenically unsaturated compound.

Table No. 5 contains the polymerization data of UPRs which, together with monomers of the conventional type (styrene, p-ME-styrene, N-vinylpyrrolidone, DAP), contain acetoxacetoxy-isopropyl methac- TABLE No. 3

UPR polymerization in DAP/AAEMA and in DAP/styrene at 25° C.
(alkyd = 55 percent; vinyl monomers = 45 percent)

| VINYL MONOMERS | UPR No. 23 | UPR No. 24 | UPR No. 25 | UPR No. 26 | UPR No. 27 | UPR No. 28 | UPR No. 29 | UPR No. 30 | UPR No. 31 |
|---|---|---|---|---|---|---|---|---|---|
| DAP % | 45.0 | 33.8 | 22.5 | 11.2 | — | 33.8 | 22.5 | 11.2 | — |
| Styrene (%) | — | — | — | — | — | 11.2 | 22.5 | 33.8 | 45.0 |
| AAEMA (%) | — | 11.2 | 22.5 | 33.8 | 45.0 | — | — | — | — |
| PARAMERIZATION PARAMETERS | | | | | | | | | |
| Gel time | 26'50" | 26'40" | 18'47' | 12'53" | 9'45" | 23'10" | 20'30" | 18'10" | 16'50" |
| Polymerization time | 56"50" | 45' | 28' | 19' | 14'10" | 40'45" | 36'15" | 31'18" | 27'10" |
| Peak temperature (°C.) | 46° | 153° | 153° | 136° | 105° | 142° | 155° | 165° | 191° |
| Delta time | 30' | 18'20" | 9'13" | 6'07" | 4'25" | 17'35" | 15'45" | 13'08" | 10'20" |
| Barcol hardness (24 h) | n. det. | 45 | 45 | 45 | 40 | n. det. | n. det. | n. det. | 45 |
| Unreacted DAP (%) | 7.7 | traces | traces | traces | — | 3.9 | 1.5 | 1.2 | — |

Polymerization conditions:
Methyl ethyl ketone peroxide (50 percent solution in di-n-butylphthalate): 1.5 parts/100 parts of UPR
Co octoate (6 percent solution in xylene): 0.3 parts/100 parts of UPR
N,N-Dimethyl-acetoacetamide: 0.4 parts/100 parts of UPR
abbreviation: n. det. = not detectable

EXAMPLE 4

The UPRs used in this example are based on the same alkyd as in Example 3. The behavior of UPRs in which the monomer is a ternary DAP/styrene/AAEMA mixture, is illustrated. The results of polymerization tests with UPRs containing only styrene/AAEMA are also reported for comparison. All the polymerization reactions are very fast and highly exothermic.

rylate (AAPMA) as the monomer of the invention. To facilitate the comparison, polymerization data of UPRs Nos. 1, 15, 19 and 23 (this last resin is highly underpolymerized; cf. Example 3) are shown in the last columns of Table No. 5.

It should also be said that the DAP-based UPRs in Table 5 have a monomer plus accelerating monomer content of 45 percent and that the alkyd (55 percent) is that of Example No. 3, whereas the other UPRs have a TABLE No. 4

UPR polymerizations DAP/AAEMA/styrene at 25° C. (alkyd = 55 percent; vinyl monomers = 45 percent)

| VINYL MONOMERS | UPR No. 31 | UPR No. 32 | UPR No. 33 | UPR No. 34 | UPR No. 35 | UPR No. 36 | UPR No. 37 | UPR No. 38 | UPR No. 39 | UPR No. 40 | UPR No. 41 | UPR No. 42 | UPR No. 43 |
|---|---|---|---|---|---|---|---|---|---|---|---|---|---|
| DAP % | — | 31.2 | 19.4 | 9.0 | — | 27.0 | 15.4 | 6.2 | — | 19.4 | 9.0 | 3.4 | — |
| Styrene (%) | 45 | 3.4 | 6.2 | 9.0 | 11.2 | 9.0 | 14.8 | 19.4 | 22.5 | 19.4 | 27.0 | 31.2 | 33.8 |
| AAMMA (%) | — | 10.4 | 19.4 | 27.0 | 33.8 | 9.0 | 14.8 | 19.4 | 22.5 | 6.2 | 9.0 | 10.4 | 11.2 |
| POLYMERIZATION PARAMETERS | | | | | | | | | | | | | |
| Gel time | 16'50" | 3'40" | 2'17" | 1'50" | 1'27" | 2'20" | 1'35" | 1'15" | 1'14" | 1'32" | 1'29" | 1'23" | 1'15" |
| Polymerization time | 27'10" | 12'10" | 7'40" | 6'10" | 7' | 7'30" | 5'35" | 5' | 6' | 7'02" | 6'29" | 5'20" | 6'20" |
| Peak temp. (°C.) | 191° | 177° | 172° | 160° | 147° | 178° | 173° | 177° | 180° | 182° | 197° | 202° | 208° |
| Delta time | 10'20" | 8'30" | 5'23' | 4'20" | 5'33" | 5'10" | 4' | 3'45" | 4'46" | 5'30" | 5' | 3'57" | 5'05" |

Polymerization conditions:
Methyl ethyl ketone peroxide (50 percent solution in di-n-butylphthalate): 1.5 parts/100 parts of UPR
Co octoate (6 percent solution in xylene): 0.3 parts/100 parts of UPR
N,N-Dimethyl-acetoacetamide: 0.4 parts/100 parts of UPR

EXAMPLE 5

This example demonstrates that the accelerating effect on the polymerization of the UPRs is common to all monomer plus accelerating monomer content of 35 percent and the alkyd (65 percent) is that from Example No. 1, Table 1a.

TABLE 5

UPR polymerization in conventional monomers or mixtures with conventional monomers/promoters monomers at 25° C.
(UPR Nos. 1, 15, 19 and UPR Nos. 44, 46: alkyd = 65 percent; monomers = 35 percent)
(UPR No. 23 and UPR No. 47: alkyd = 55 percent; monomers = 45 percent)

| VINYL MONOMERS | UPR No. 44 | UPR No. 45 | UPR No. 46 | UPR No. 47 | UPR No. 1 | UPR No. 15 | UPR No. 19 | UPR No. 23 |
|---|---|---|---|---|---|---|---|---|
| Styrene (%) | 30.0 | — | — | — | 35.0 | — | — | — |
| p-Me-styrene (%) | — | 30.0 | — | — | — | 35.0 | — | — |
| N-vinyl-pyrrolidone (%) | — | — | 30.0 | — | — | — | 35.0 | — |
| DAP (%) | — | — | — | 35.0 | — | — | — | 45.0 |
| AAPMA (%) | 5.0 | 5.0 | 5.0 | 10.0 | — | — | — | — |
| POLYERIZATION PARAMETERS | | | | | | | | |
| Gel time | 10'30" | 7'30" | 6'25" | 12'10" | 50' | 40'20" | 35'30" | 26'50" |
| Polymerization time | 19'30" | 13'15" | 11' | 21'55" | 69' | 60'50" | 55'40" | 56'50" |
| Peak temperature (°C.) | 162° | 163° | 168° | 163° | 155° | 142° | 145° | 46° |
| Delta time | 9' | 5'45" | 4'35" | 9'45" | 19' | 20'30" | 20'10" | 30' |

Annex to Table No. 5 on the following page

Annex to Table No. 5

Polymerization conditions (UPRs in DAP):

Methylethylketone peroxide (50 percent solution in di-n-butyl-phthalate): 1.5 parts/100 parts UPR Co octoate (6 percent solution in xylene): 0.3 part/100 parts UPR N,N-dimethyl-acetoacetamide: 0.4 part/100 parts UPR Polymerization conditions (other UPRs):

Methylethylketone peroxide (50 percent solution in di-n-butyl-phthalate): 0.8 part/100 parts UPR Co octoate (6 percent solution in xylene): 0.3 part/100 parts UPR

EXAMPLE 6

Some of the UPRs, for which the polymerization parameters at 25° C. have been given in the preceding examples, were polymerized while hot, according to the so-called SPI polymerization test. The polymerization times are reported in Table No. 6. The table shows that the crosslinking monomers according to the invention give optimum performance, at least as good as the conventional monomers even in hot polymerizations.

TABLE 6

UPR polymerization in conventional monomers/promoter monomers mixtures at 180° F. (82.2° C.)
(UPR Nos. 23, 24, 47, 40, 43; alkyd = 55 percent; monomers = 45 percent)
(UPR Nos. 1, 6, 44: alkyd = 65 percent; monomers = 35 percent)

| VINYL MONOMERS | UPR No. 1 | UPR No. 6 | UPR No. 23 | UPR No. 24 | UPR No. 47 | UPR No. 40 | UPR No. 43 | UPR No. 44 |
|---|---|---|---|---|---|---|---|---|
| Styrene (%) | 35.0 | — | — | — | — | 19.4 | 33.8 | 30.0 |
| DAP (%) | — | — | 45.0 | 33.8 | 35.0 | 19.4 | — | — |
| AAEMA (%) | — | 35.0 | — | 11.2 | — | 6.2 | 11.2 | — |
| AAPMA (%) | — | — | — | — | 10.0 | — | — | 5.0 |
| POLYERIZATION PARAMETERS | | | | | | | | |
| Gel time | 8'30" | 7' | 1'26" | 1'29" | 1'25" | 1'34" | 1'26" | 6'15" |
| Polymerization time | 15'45" | 15'40" | 8'21" | 7'57" | 8'10" | 9'08" | 10'16" | 9'25' |
| Peak temperature (°C.) | 175° | 145° | 193° | 185° | 188° | 202° | 221° | 187° |
| Delta time | 7'15" | 8'40" | 6'55" | 6'28" | 6'45" | 7'34" | 8'50" | 3'10" |

Polymerization conditons:
Benzoyl peroxide (50 percent solution in di-n-butylphthalate): 2.0 parts/100 parts UPR
Co octoate (6 percent solution in o-xylene): 0.3 parts/100 parts UPR

EXAMPLE 7

In this example the physical and mechanical properties of some representative UPRs, i.e., UPR No. 1, No. 5, No. 23 and No. 24 are compared.

Table 7a shows these properties determined after 24 hours of polymerization at room temperature and 3 hours of postcuring at 100° C. Table 7b shows these properties determined after 24 hours of polymerization at room temperature without postcuring.

The following standard tests were applied:
tensile strength ASTM D638
tensile modulus ASTM D638
flexural strength ASTM D790
flexural modulus ASTM D790
heat deflection temperature HDT, see ASTM D648

If one considers the data on Tables No. 7a, 7b and 7c, one sees that UPRs containing AAEMA (UPR No. 5 and No. 24) show lower values for elongation at break, in comparison with the similar UPRs not containing AAEMA (UPR No. 1 and No. 23), but higher values for all other parameters. This data comparison demonstrates that by using the monomers-accelerators, which are the object of the present invention, it is possible to obtain at room temperature a higher degree of crosslinking.

TABLE 7a

Comparison between mechanical and thermal properties of UPRs cured at 25° C. (24 hours) and cured and postcured (24 hours at 25° C. and 3 hours at 100° C.)

| VINYL MONOMERS | UNIT | UPR No. 1 | UPR No. 5 | UPR No. 23 | UPR No. 24 |
|---|---|---|---|---|---|
| Styrene | (%) | 35.0 | 25.0 | — | — |
| AAEMA | (%) | — | 10.0 | — | 11.2 |
| DAP | (%) | — | — | 45.0 | 33.8 |
| Treatment: CURING + POSTCURING | | Curing: 24 hours at 25° C. Postcuring: 3 hours at 100° C. | | | |
| Tensile strength | MPa | 79 | 74 | 53 | 56 |
| Tensile modulus | MPa | 3840 | 3540 | 3560 | 3080 |
| Elongation at break | % | 2.7 | 3.4 | 1.8 | 2.8 |

TABLE 7a-continued

Comparison between mechanical and thermal properties of UPRs cured at 25° C. (24 hours) and cured and postcured (24 hours at 25° C. and 3 hours at 100° C.)

| VINYL MONOMERS | UNIT | UPR No. 1 | UPR No. 5 | UPR No. 23 | UPR No. 24 |
| --- | --- | --- | --- | --- | --- |
| Flexural strength | MPa | 150 | 141 | 128 | 124 |
| Flexural modulus | MPa | 4150 | 3860 | 4130 | 3370 |
| Heat deflection temperature | °C. | 64° | 49° | 64° | 50° |

Polymerization conditions:
UPRs No. 1 and No. 5: see Table 1a
UPRs No. 23 and No. 24: see Table 3

TABLE 7b

Comparison between mechanical and thermal properties of UPRs cured at 25° C. (24 hours) and cured and postcured (24 hours at 25° C. and 3 hours at 100° C.)

| VINYL MONOMERS | UNIT | UPR No. 1 | UPR No. 5 | UPR No. 23 | UPR No. 24 |
| --- | --- | --- | --- | --- | --- |
| Styrene | (%) | 35.0 | 25.0 | — | — |
| AAEMA | (%) | — | 10.0 | — | 11.2 |
| DAP | (%) | — | — | 45.0 | 33.8 |
| Treatment: CURING | | Curing: 24 hours at 25° C. Postcuring: none | | | |
| Tensile strength | MPa | 48 | 55 | 15 | 27 |
| Tensile modulus | MPa | 2440 | 2680 | 700 | 1520 |
| Elongation at break | % | 12.7 | 9.3 | 11.1 | 12.2 |
| Flexural strength | MPa | 85 | 91 | not det. | 60 |
| Flexural modulus | MPa | 2060 | 2250 | not det. | 1520 |
| Heat deflection temperature | °C. | 40° | 36° | not det. | 32° |

Polymerization conditions:
UPRS No. 1 and No. 5: see Table 1a
UPRs No. 23 and No. 24: see Table 3
Note: not det. = not detectable (because too low)

TABLE 7c

Comparison between mechanical and thermal properties of UPRs cured at 25° C. (24 hours) and cured and postcured (24 hours at 25° C. and 3 hours at 100° C.)

| VINYL MONOMERS | UNIT | UPR No. 1 | UPR No. 5 | UPR No. 23 | UPR No. 24 |
| --- | --- | --- | --- | --- | --- |
| Styrene | (%) | 35.0 | 25.0 | — | — |
| AAEMA | (%) | — | 10.0 | — | 11.2 |
| DAP | (%) | — | — | 45.0 | 33.8 |
| | | Ratios Ration between the values of Table No. 7b and values of Table No. 7a | | | |
| Tensile strength | | 0.61 | 0.74 | 0.28 | 0.48 |
| Tensile modulus | | 0.64 | 0.76 | 0.20 | 0.49 |
| Elongation at break | | 4.70 | 2.74 | 6.17 | 4.36 |
| Flexural strength | | 0.57 | 0.65 | — | 0.48 |
| Flexural modulus | | 0.50 | 0.58 | — | 0.45 |
| Heat deflection temperature | | 0.63 | 0.73 | — | 0.64 |

Polymerization conditions:
UPRs No. 1 and No. 5: see Table 1a
UPRs No. 23 and No. 24: asee Table 3

What is claimed is:

1. Non-solvent unsaturated polyester resin composition which is curable at room temperature, comprising at least one unsaturated polyester resin and 10 to 60 percent by weight, based on the total weight of said unsaturated polyester resin composition, of at least one crosslinking monomer, the at least one crosslinking monomer comprising at least one compound of formula (I):

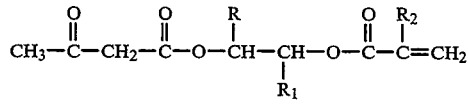

wherein R is H or a methyl group, $R_1$ is H or a methyl group and $R_2$ is H or a methyl group.

2. Process for preparing a non-solvent unsaturated polyester resin composition, which is curable at room temperature comprising at least one unsaturated polyester resin and 10 to 60 percent by weight, based on the total weight of said unsaturated polyester resin composition, of at least one crosslinking monomer, the at least one crosslinking monomer comprising at least one compound of formula (I):

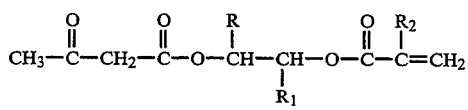

wherein R is H or a methyl group, $R_1$ is H or a methyl group and $R_2$ is H or a methyl group, the process comprising crosslinking a polycondensate of at least one monomeric or polymeric glycol with at least one ethylenically $\alpha,\beta$-unsaturated dicarboxylic acid or an anhydride thereof with the at least one crosslinking monomer, the at least one crosslinking monomer comprising the at least one compound of the formula (I):

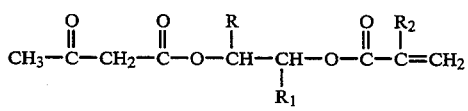

wherein R, $R_1$ and $R_2$ have the above-stated meanings.

3. Non-solvent unsaturated polyester resin composition which is curable at room temperature, comprising at least one unsaturated polyester resin and 10 to 60 percent by weight, based on the total weight of said unsaturated polyester resin composition, of at least one crosslinking monomer, said at least one unsaturated polyester resin has been obtained by the reaction of at least one monomeric or polymeric glycol with at least one ethylenically $\alpha,\beta$-unsaturated dicarboxylic acid or an anhydride thereof, said at least one monomeric or polymeric glycol being at least one member selected from the group consisting of ethylene glycol, 1,2-propylene glycol, 1,3-butanediol, 1,4-butanediol, diethylene glycol, dipropylene glycol, neopentyl glycol, the bis-($\beta$-hydroxypropyl) ether of bisphenol A, dibromoneopentyl glycol, and the tetrabromo derivative of bisphenol A, said at least one ethylenically $\alpha,\beta$-unsaturated dicarboxylic acid or anhydride thereof being at least one member selected from the group consisting of maleic acid, fumaric acid, citraconic acid, mesaconic acid, maleic anhydride, fumaric acid, citraconic anhydride, and mesaconic anhydride, and said at least one crosslinking monomer being at least one compound of formula (I):

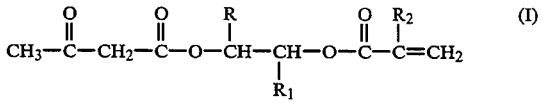

wherein R is H or a methyl group, $R_1$ is H or a methyl group and $R_2$ is H or a methyl group.

4. The composition according to claim 1 wherein said compound of formula (I) is selected from the group consisting of acetoacetoxy-ethyl methacrylate and acetoacetoxy-isopropylmethacrylate.

5. The composition according to claim 1 wherein said compound of formula (I) is acetoacetoxy-ethyl methacrylate.

6. The compositions according to any one of claims 1, 4 and 5 wherein the composition contains said at least one compound of formula (I) in a concentration of from 0.1 to 59 percent by weight, based on the total weight of said unsaturated polyester resin composition, and contains at least one further monomer selected from the group consisting of a vinyl monomer, and an allyl ester monomer, said at least one further monomer being present in a concentration of from 1 to 59.9 percent by weight, based on the total weight of said unsaturated polyester resin composition.

7. The composition according to claim 6 wherein said at least one further monomer is selected from the group consisting of styrene, p-methyl-styrene, tetrachloroethylene, N-vinylpyrrol idone, vinyl-toluene and diallyl phthalate, at least one prepolymer of any of said at least one further monomer, a mixture of at least two of said at least one further monomer, a mixture of at least two of said at least one prepolymer, and a mixture of at least one of said at least one further monomer and at least one of said at least one prepolymer.

8. The composition according to claim 6 wherein said at least one further monomer is styrene.

9. The composition according to claim 6 wherein said at least one further monomer is diallylphthalate.

10. The composition according to claim 6 wherein said at least one unsaturated polyester resin is a polyester obtained by the reaction of at least one monomeric or polymeric glycol with at least one ethylenically $\alpha,\beta$-unsaturated dicarboxylic acid or an anhydride thereof.

11. The composition according to claim 10 wherein said at least one unsaturated polyester resin is obtained by the reaction of a said at least one monomeric or polymeric glycol with a said at least one ethylenically unsaturated dicarboxylic acid mixed with at least one saturated dicarboxylic acid.

12. The composition according to claim 10 wherein said at least one ethylenically unsaturated acid is selected from the group consisting of maleic acid, fumaric acid, citraconic acid, mesaconic acid, at least one anhydride of any of said at least one ethylenically unsaturated acid, a mixture of at least two of said at least one ethylenically unsaturated acid, a mixture of at least two of said at least one anhydride of any of said at least one ethylenically unsaturated acid, and a mixture of at least one of said at least one ethylenically unsaturated acid and at least one of said at least one anhydride of any of said at least one ethylenically unsaturated acid.

13. The composition according to claim 1 wherein said unsaturated polyester resin composition contains a free-radical polymerization catalyst in a quantity of 0.1 to 3 parts by weight per 100 parts by weight of said at least one unsaturated polyester resin.

14. The composition according to claim 1 wherein said unsaturated polyester resin composition additionally contains a curing accelerator selected from the group consisting of at least one cobalt salt, at least one manganese salt, at least one vanadium salt, at least one iron salt, at least one $\beta$-diketone and at least one tertiary aromatic amine, said curing accelerator being present in a concentration of 0.05 to 1 part per 100 parts of said at least one unsaturated polyester resin.

15. The composition according to claim 1 wherein said unsaturated polyester resin composition is cross-linkable at a temperature between ambient temperature and 180° C.

16. Process for preparing unsaturated polyester resin compositions according to claim 1, comprising cross-linking a polycondensate of at least one monomeric or polymeric glycol with at least one ethylenically $\alpha,\beta$-unsaturated dicarboxylic acid or an anhydride thereof with at least one crosslinking monomer, characterized in that said crosslinking monomer or monomers comprises at least one compound of the formula (I):

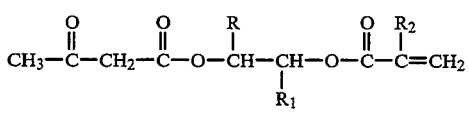

wherein R, $R_1$ and $R_2$ each is H or a methyl group.

17. The process according to claim 2 wherein said at least one compound of the formula (I) is selected from the group consisting of acetoacetoxy-ethyl methacrylate and acetoacetoxy-isopropylmethacrylate.

18. The process according to claim 2 wherein said at least one compound of formula (I) is acetoacetoxy-ethyl methacrylate.

19. The process according to any one of claims 2, 17 or 18 wherein said at least one compound of the formula (I) in a concentration from 0.1 to 59 percent by weight is present and at least one further monomer selected from the group consisting of vinyl monomers and allyl ester monomers, said at least one further monomer being present in a concentration from 1 to 59.9 percent by weight.

20. The process according to claim 19 wherein said at least one further monomer is selected from the group consisting of styrene, p-methyl-styrene, tetrachloroethylene, N-vinylpyrrolidone, vinyl-toluene and diallyl phthalate, at least one prepolymer of any of said at least one further monomer, a mixture of at least two of said at least one further monomer, a mixture of at least two of said at least one prepolymer, and a mixture of at least one of said at least one further monomer and at least one of said at least prepolymer.

21. The process according to claim 19 wherein said at least one further monomer is styrene.

22. The process according to claim 19 wherein said at least one further monomer is diallylphthalate.

23. The process according to claim 2 wherein said at least one ethylenically $\alpha,\beta$-unsaturated acid is selected from the group thereof maleic acid, fumaric acid, citraconic acid, mesaconic acid, at least one anhydride of any of said at least one ethylenically unsaturated acid, a mixture of at least two of said at least one ethylenically unsaturated acid, a mixture of at least two of said at least one anhydride of any of said at least one ethylenically unsaturated acid, and a mixture of at least one of said at least one ethylenically unsaturated acid and at least one of said at least one anhydride of any of said at least one ethylenically unsaturated acid.

24. The process according to claim 2 wherein a free-radical polymerization catalyst is present in a quantity of 0.1 to 3 parts by weight per 100 parts by weight of at least one unsaturated polyester resin.

25. The process according to claim 2 wherein additionally a curing accelerator selected from at least one cobalt salt, at least one manganese salt, at least one vanadium salt, at least one iron salt, at least one, β-diketone and at least one tertiary aromatic amine, is present, said curing accelerator being present in a concentration of 0.05 to 1 part per 100 parts of said at least one unsaturated polyester resin.

26. The process according to claim 2 wherein the crosslinking is effected at a temperature of between ambient temperature and 180° C.

* * * * *